Jan. 5, 1960 D. R. WHITNEY 2,919,960
PRECISION SPINDLE

Filed Oct. 15, 1958 4 Sheets-Sheet 2

INVENTOR.
Donald R. Whitney
BY
D. D. Burch
ATTORNEY

INVENTOR.
Donald R. Whitney
BY
R.D. Burch
ATTORNEY

Jan. 5, 1960

D. R. WHITNEY 2,919,960

PRECISION SPINDLE

Filed Oct. 15, 1958

INVENTOR.
Donald R. Whitney
BY
R. D. Burch
ATTORNEY

United States Patent Office 2,919,960
Patented Jan. 5, 1960

2,919,960

PRECISION SPINDLE

Donald R. Whitney, Detroit, Mich., assignor to General Motors Corporation, Detroit, Mich., a corporation of Delaware Application October 15, 1958, Serial No. 767,475

4 Claims. (Cl. 308—122)

This invention relates to machine spindles and more particularly to a precision spindle having hydrostatic support for the bearing surfaces to provide substantially true rotation of the parts.

In machining operations, and particularly in those operations where precision machining is required, there has been great difficulty in obtaining an accurate rotation of the work table, or rotating machine part, such that the cutting tool will give the desired results. In design and development work, and in a certain amount of production work, precision machining is an absolute necessity in order to provide parts having a proper relationship between themselves. Most machines which purport to provide accurate rotation of the work table or the cutting tool provide only an accuracy of rotation within certain limits. Conceding that it is impossible to obtain exactly accurate rotation, the problem then is to obtain rotation within as narrow limits as possible. This problem has not adequately been solved in the past.

The device in which this invention is embodied comprises a dumbbell shaped spindle which is mounted in a suitable bearing block and hydrostatically supported in the bearing block. If the mating surfaces of the spindle and the block are precision ground, lapped, and properly mated, it is possible, through the use of hydrostatic bearings, to obtain hitherto unknown narrow limits of accuracy of rotation. The device is relatively simple in structure and easy to operate, and great savings are afforded the manufacturer in obtaining precision machined parts and savings in parts rejected due to overlying the limits of accuracy of the design.

Figure 1:
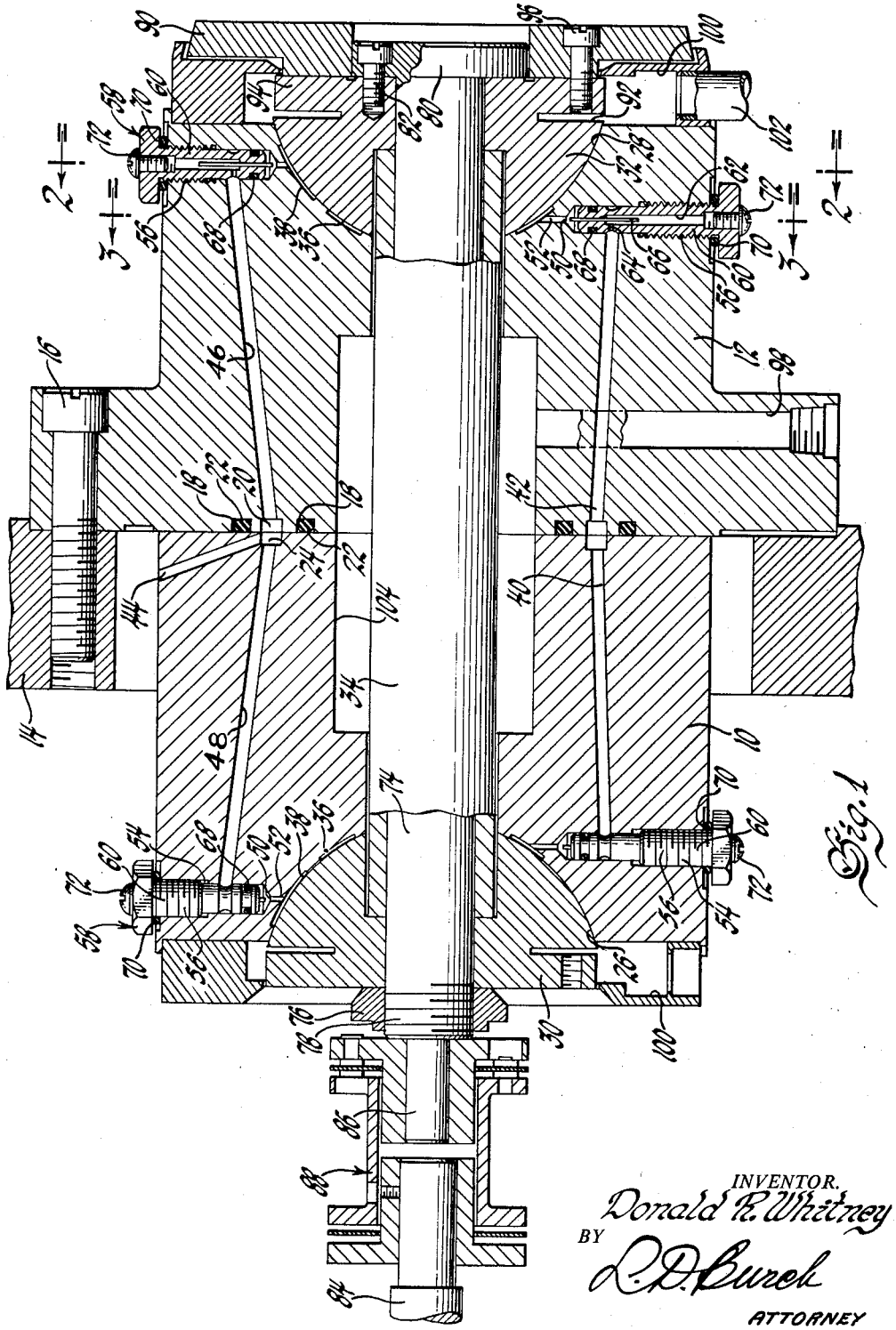
Figure 1 is a view of the precision spindle with parts broken away and in section to illustrate the relative position of the various parts.
Figure 2:
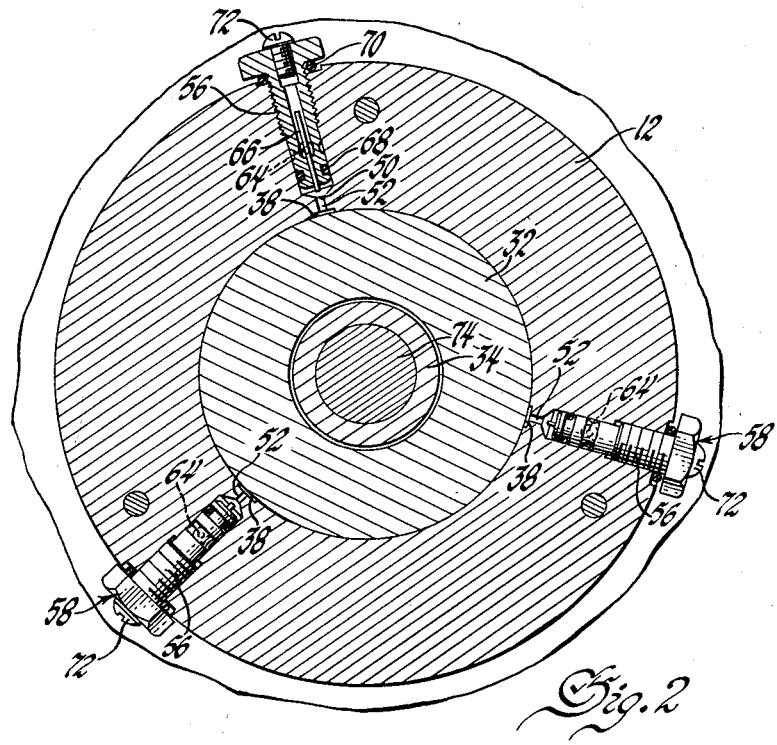
Figure 2 is a cross sectional view of the spindle of Figure 1 taken substantially along the line 2—2 of Figure 1 and looking in the direction of the arrows.
Figure 3:
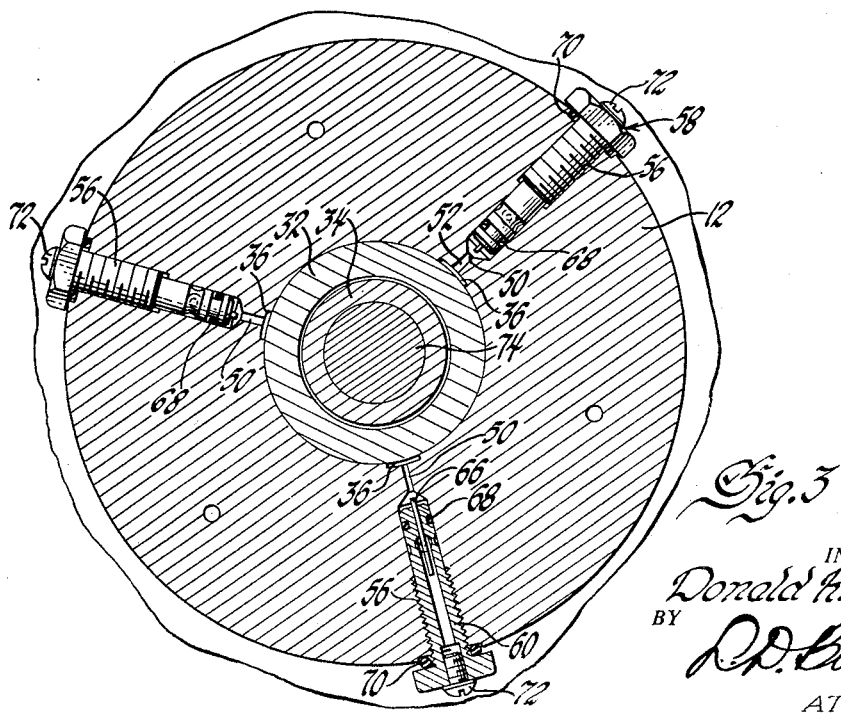
Figure 3 is a cross sectional view of the spindle shown in Figure 1 taken substantially along the line 3—3 and looking in the direction of the arrows.

Referring more particularly to the drawings, Figures 1 and 2 illustrate the preferred embodiment of the invention. A bearing block, formed in two halves 10 and 12 which may be joined in any suitable manner, provides the support for the precision spindle. The spindle and bearing block assembly may be mounted adjacent a manufacturing machine by the annular flange 14 secured to the bearing block portion 12, as by bolts 16. Bearing block portion 12 is provided with a plurality of annular grooves 18 and 20 in the mating surface thereof, the grooves 18 having the O-rings 22 mounted therein to provide a fluid tight joint between the bearing block portions 10 and 12. A mating groove 24 is provided in the joining surface of the bearing block portion 10 which is complementary to the groove 20 in the portion 12. When the portions 10 and 12 are joined, the grooves 20 and 24 provide an annular passage, the purpose of which will be later described.

Formed in the outer ends of the bearing block portions 10 and 12 are the spherical cavities 26 and 28. The cavities are precision ground, as will be later described, and serve as bearing seats for the spherically surfaced members 30 and 32.

The spherically surfaced members 30 and 32 are rotatably received in the cavities 26 and 28 and are connected through the bearing block portions by the tubular shaft 34. The tubular shaft is disposed in axial alignment with respect to the bearing block, and in axial alignment with respect to the cavities 26 and 28 and the spherically surfaced members 30 and 32. The shaft 34 serves as a connection between the members 30 and 32 such that rotation of one will be imparted to the other, and also to serve as lengthwise positioning means for the two members.

The spherical cavities 26 and 28 are provided with a plurality of recesses 36 and 38 of a nominal depth, which serve as hydrostatic bearing pads for the spherically surfaced members 30 and 32. The pads are formed in any convenient shape such that a fluid may be distributed over the pad area with an undiminished pressure and with as small a volume as possible. The pads 36 are equally spaced around the cavity 26 and adjacent the opening which contains the tubular shaft 34. With the pads thus positioned, axial support for the member 30 is provided. Similarly, the pads 38 are equally spaced in the cavity 26 and adjacent the outer edge of the cavity to provide radial support for the member 30. The pads 36 and 38 are located in the same manner with respect to the spherical cavity 28 to provide support in the axial and radial directions for the member 32.

The bearing block portions 10 and 12 are provided with fluid passages, such as 40 and 42, and 46 and 48, which are adapted to convey a fluid from the mating grooves 20 and 24 to the recesses 36 and 38 formed in the cavities 26 and 28. The fluid inlet 44 conveys fluid from a suitable supply to the central passage formed by the complementary grooves 20 and 24. The passages communicate with the pads through orifices 50 and secondary passages 52. Thus, fluid, such as oil, entering through the inlet 44 and the passages 40, 42, 46 and 48 will be conveyed to the pads 36 and 38 to provide the hydrostatic bearing support.

Adjacent each of the orifices is a stepped opening 54 in the bearing block portions 10 and 12. The larger portion of the stepped opening is threaded, as at 56, to receive the orifice restrictor assembly, indicated generally by the numeral 58. The assembly consists of a shank portion 60, threaded at its upper end to engage the threads 56, and having an opening 62 therethrough which communicates with the orifice 50. A lateral opening 64 provides communication between the passage 40, or 42, and the central opening 62 in the shank member. A tube 66 is receivable in the opening 62 and may be suitably placed to form the orifice 50. Thus, a control is established for the flow of fluid from the passage 42, through the opening 64 and to the orifice 50. O-rings 68 about the inner end of the shank members prevent back flow of fluid around the shanks from the orifices 50. A second series of O-rings 70 prevent the back flow of fluid along the threads 56. Machine screws 72 are provided in the shank members for access to the rods 66 when it is desired to vary the orifice size.

In order to provide the driving connections through the spindle, a center post 74 is disposed in the tubular shaft 34 and through the members 30 and 32. In order to achieve as great an accuracy as possible the center post must be attached as far as possible from the spherical surfaces of the spherically surfaced members 30 and 32. As viewed in Figure 1, the left hand end of the center post 74 is secured to the member 30 by a nut 76 engaging the threads 78 on the center post. The right hand end of the center post 74 has an enlarged head portion 80 formed thereon which is secured to the member 32 by a plurality of bolts 82. Care must be taken in seating the center post in the spherically surfaced members to avoid stresses which might distort the surfaces of the members.

The center post 74 further provides means for properly seating the members 30 and 32 in the cavities 26 and 28. By tightening the nut 76, the members are pulled together against the ends of the tubular shaft 34. Adjustment up to a thousandth of an inch, or so, is possible, providing a better bearing connection.

The driving member for the precision spindle may be of any suitable type, such as an electric motor. A driving shaft 84 is connected to an extension 86 on the center post 74 by a conventional alignment mechanism, illustrated generally by the numeral 88. The purpose of this mechanism is to prevent any misalignment of the shaft 84 from being transmitted to the center post 74. The driven connection 90, such as a machine work table or the like, is secured to the other end of the spindle and directly to the spherically surfaced member 32. An annular slot 92 is provided in the member to define a flange 94 to which is connected the driven member 90, as by the bolts 96. The flange connection aids in preventing stresses and distortion in the member 32. Any suitable machine connection may be made to the member 90, such as a work piece or a cutting tool.

Passages 98 and 100 and the conduit 102 are provided in the bearing block portions 10 and 12 such that any overflow of bearing fluid between the surfaces of the spherically surfaced members and the cavities may be drained from the system. The passage 98 communicates with a cavity 104 in the bearing block and serves to drain any fluid passing between the tubular shaft 34 and the bearing block portions.

In manufacturing the device and in obtaining precision surfaces for the members 30 and 32 and the cavities 26 and 28, the surfaces are generated by lapping the two parts together in matched pairs. In has been found that a correct size of lapping compound is necessary in order to maintain the desired clearance over the entire spherical surface. Any lapping compound may be used as long as the contours of the surface are correct and the desired accuracy of position is achieved.

Figure 4:
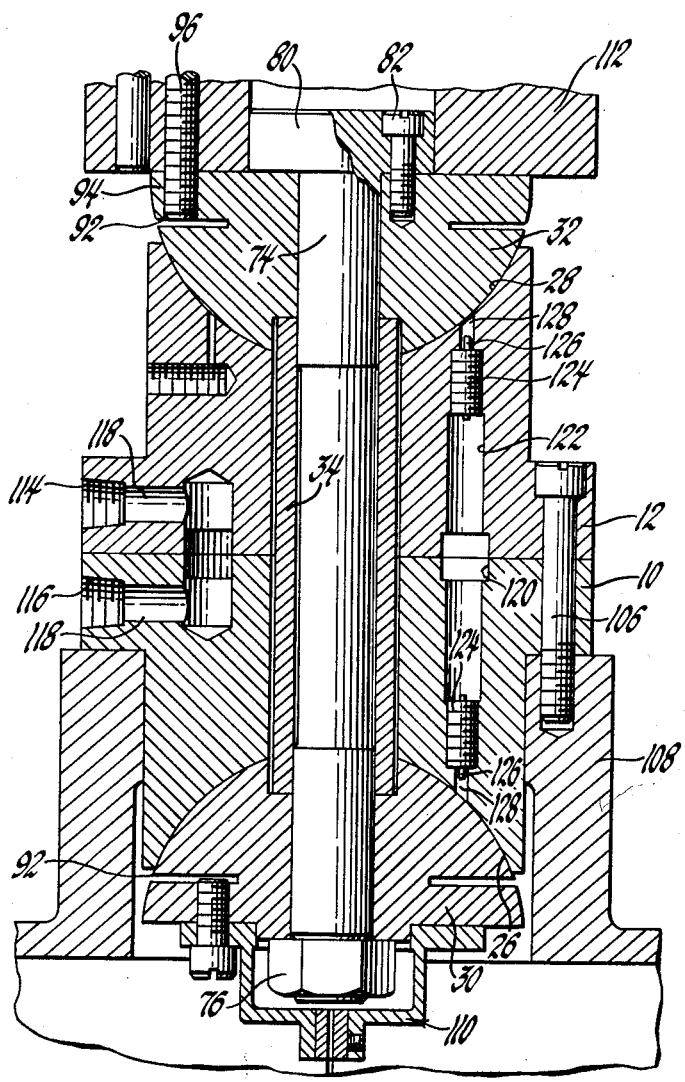
Figure 4 is a view of a modification of the spindle shown in Figure 1 with parts broken away and in section to illustrate the relative location of the parts.

A modification of the device is shown in Figure 4 in which the bearing block sections 10 and 12 are joined by the bolts 106, which also secure the bearing block to the machine part 108. The spherical cavities 26 and 28 are provided in the ends of the bearing block to receive the spherically shaped members 30 and 32. A tubular central shaft 34 connects the two members 30 and 32 and a center post 74 provides a connection between the driving means, indicated generally by the numeral 110, and the driven means 112.

The bearing block construction is somewhat different in this modification, the spindle using air as a hydrostatic fluid and fewer bearing pads on each surface than in the device shown in Figures 1 and 2. Air inlets 114 and 116 communicate through the passages 118 with the central passage 120. The central passage communicates with the spherical surfaces through the passages 122.

Orifice restrictors 124 are provided in the passages 122 to provide control over the air flowing through the orifices 126. The bearing pads, instead of being in the form of machined recesses in the surface of the cavities 26 and 28, are formed by a plurality of intersecting scratches in the surface of the cavities adjacent the air passages 128 which extend between the orifices 126 and the surfaces of the cavities 26 and 28. The surface scratches are sufficient to convey air over the pad area with an undiminished pressure and as small a volume as possible.

Figure 5:
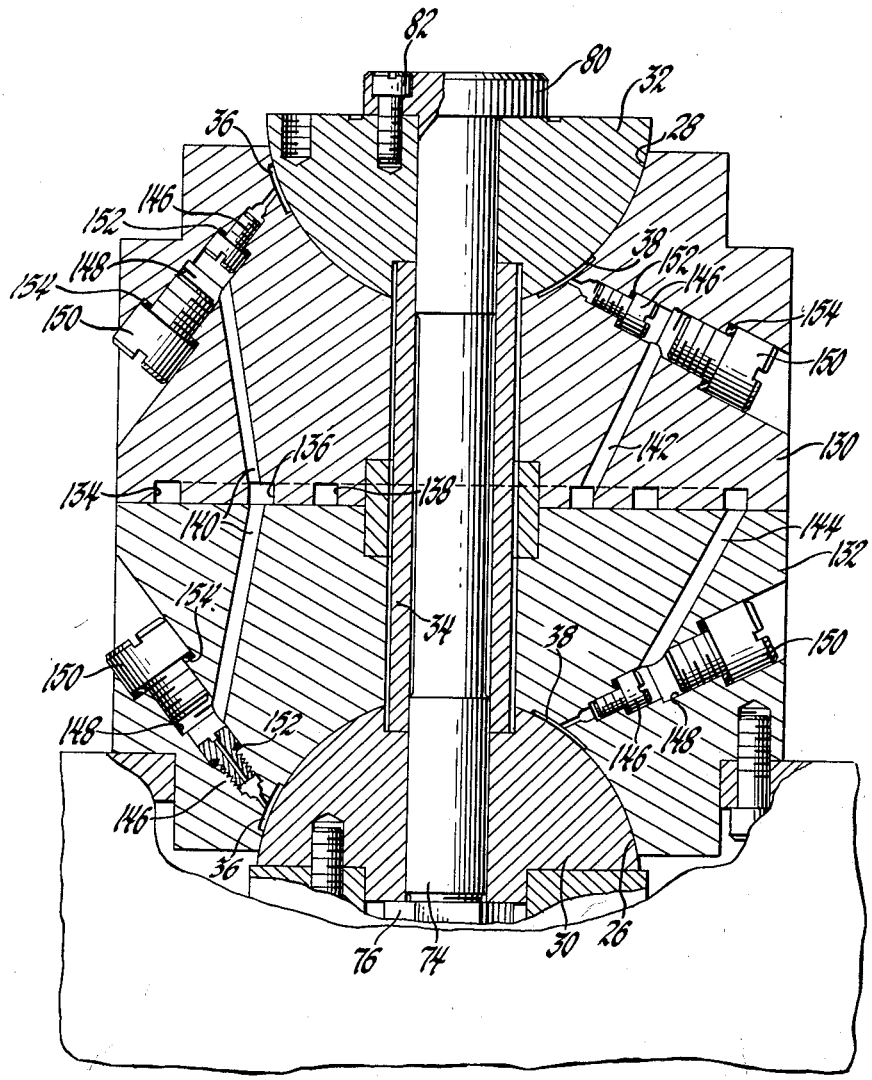
Figure 5 is a view of a second modification of the spindle shown in Figure 1 with parts broken away and in section to illustrate the relative position of the various parts.

The modification shown in Figure 5 is particularly adaptable to a machine in which the spindle is located vertically and must support some end-wise loading. The bearing block portions 130 and 132 have the spherical cavities 26 and 28 in either end thereof and retain the members 30 and 32 connected by the tubular shaft 34. The center post 74 is retained between the outer surfaces of the members 30 and 32 and is axially disposed with respect to the members, the tubular shaft and the spherical cavities.

The bearing block portion 130 has three annular concentric grooves 134, 136 and 138 respectively, formed in the joining surface thereof. The annular grooves serve as fluid passageways to convey fluid from suitable inlets to the passages 140, 142 and 144 in the bearing block portions 130 and 132.

The hydrostatic pad configuration may be in the form of recesses 36 and 38 formed in the surface of the spherical cavities 26 and 28 if the bearing fluid is to be oil, or the pads may be of the scratch configuration if the supporting fluid is to be air. With a certain amount of end-wise load placed on the upper member 32 it may be seen that varying the pressure on the axial upper pads 38, in comparison to the axial lower pads, will aid in supporting the added load.

In order to accomplish this, the passages to the upper axial pads 142 connect with the annular groove 138 having a separate inlet. Any pressure desired may then be transmitted to the bearing pads supporting the upper spherical member in the axial direction. The passage 144, communicating between the lower axial support pads and the annular groove 134, may have a different pressure therein than the pressure of the fluid in the passage 142, to compensate for the added vertical load. The passages 140 communicating with the groove 136 convey fluid in both directions and at the same pressure to the radial support bearing pads for both the upper and lower spherically surfaced members.

Orifice restrictors 146 are provided adjacent all bearing pads in the stepped openings 148, the orifice restrictors being sealed in the passages by the set screws 150. O-rings 152 and 154 prevent the back flow of fluid through the stepped openings 148.

It is not desired to limit the above described device to the use of any particular fluid, or to the use of any particular orifice restrictor devices, the structure being limited only by the scope of the appended claims.

I claim:

1. A precision spindle for use with a machine having a rotating work holding member and comprising a bearing block having a spherical cavity formed in each end thereof, said bearing block being formed of a pair of generally alike portions and having annular mating grooves formed in the adjoining surfaces thereof, a spherically surfaced member rotatably received in each of said cavities, said cavities and said spherically surfaced members having precision ground and lapped mating surfaces, a tubular shaft through said bearing block and connecting the inner portions of said spherically surfaced members, said bearing block cavities having a plurality of recesses formed therein to receive a fluid for hydrostatically supporting said members in the radial and axial directions, passage means in said bearing block communicating between said grooves and said recesses to convey fluid thereto, orifice restrictors in said passage means and adjacent each of said recesses to control the amount of fluid flowing thereto, a center post extending axially through said spherically surfaced members and through said tubular shaft and secured to said spherically surfaced members at the outer surfaces thereof, driving means secured to one end of said center post, and driven means secured to the opposite end of said center post, said spherically surfaced members and said fluid flow recesses providing relatively frictionless and accurate rotation of said driven means by said driving means.

2. A precision spindle for use with a machine having a rotating member and comprising a bearing block having a spherical cavity axially disposed in each end thereof, said bearing block being formed from two similar portions and having an annular groove formed in the adjoining surface of at least one of said portions, a spherically surfaced member received in each of said cavities, said cavities and said members having precision ground and lapped mating surfaces, a tubular shaft axially disposed through said bearing block and connecting the innermost portions of said spherically surfaced members, each of said cavities having six shallow recesses formed in the surface thereof, fluid passage means in said bearing block and communicating between said groove and said recesses, three of said recesses being equally spaced around each of said cavities and substantially adjacent said tubular shaft to provide hydrostatic support for said spherically surfaced members in an axial direction, the remainder of said recesses being equally spaced around each of said cavities and substantially adjacent the outer edge thereof to provide hydrostatic support for said spherically surfaced members in a direction normal to the surface thereof, orifice restrictors in said passage means and adjacent each of said recesses to control the amount of fluid flowing therethrough, fluid inlet means in said bearing block communicating with said groove and said passage means, and a center post disposed in said tubular shaft and through said spherically surfaced members and secured to said members at the outer portions thereof to transmit torque from a driving means on one side of said spindle to driven means on the other side of said spindle.

3. A precision spindle for use with a machine having a rotating member and comprising a bearing block formed of a pair of similar portions having a spherical cavity formed in each end thereof and axially disposed with respect thereto, at least one of said bearing block portions having an annular groove formed in the mating surface thereof, a pair of spherically surfaced members rotatably received in said cavities, said members and said cavities having precision ground and lapped mating surfaces, a tubular shaft rotatably and axially disposed in said bearing block and secured to said spherically surfaced members at the inner portions thereof, air passage means in said bearing block and extending from said groove and terminating in a plurality of orifices communicating with said cavities, said cavities having a plurality of scratches formed in the surface thereof about said orifices to provide a plurality of spaced hydrostatic supporting areas for said spherically surfaced members, orifice restrictors disposed in said passage means and adjacent each of said orifices to control the amount of air flowing therethrough, air inlet means in said bearing block and communicating with said groove and said passage means, and a center post disposed in said tubular shaft and through said spherically surfaced members and secured to said members at the outer portions thereof to transmit torque from a driving means on one end of said spindle to a driven means on the other end of said spindle.

4. A precision spindle for use with a machine having a rotating member and comprising a bearing block separable into first and second portions along a plane substantially normal to the surface thereof, each of said portions having a spherical cavity formed at the outer end thereof and axially disposed therein, a spherically surfaced member rotatably disposed in each of said cavities, a tubular shaft axially disposed in said bearing block and connecting said spherically surfaced members, one of said bearing block portions having a plurality of concentric annular grooves formed in the joining surface thereof, said cavities in said first and second portions having a plurality of spaced recesses formed in the surfaces thereof and adjacent the outer edges and a plurality of spaced recesses formed at the surfaces thereof adjacent said tubular shaft, first fluid passage means in said bearing block and connecting one of said annular grooves with said recesses adjacent the outer edges of said cavities, second fluid passage means in said first portion and connecting a second of said annular grooves with said recesses in said cavities adjacent said tubular shaft, third fluid passage means in said second portion and connecting a third of said annular grooves with said recesses in said cavities adjacent said tubular shaft, fluid inlet means in said bearing block for each of said annular grooves, all of said fluid passage means in said recesses providing for radial and axial hydrostatic support for said spherically surfaced members and in differing magnitudes, and a center post disposed in said tubular shaft and through said spherically surfaced members and secured to the outer surfaces of said members to transmit torque from a driving means on one end of said spindle to a driven means on the other end of said spindle.

References Cited in the file of this patent

UNITED STATES PATENTS 2,695,199   Blizard _____ Nov. 23, 1954

FOREIGN PATENTS 403,364   Italy _____ Apr. 15, 1943